United States Patent
Chudy et al.

(10) Patent No.: US 9,749,860 B2
(45) Date of Patent: Aug. 29, 2017

(54) PEER-TO-PEER WIRELESS CONNECTION BETWEEN SERVER COMPUTING DEVICE AND MOBILE CLIENT COMPUTING DEVICE FOR AUTHENTICATION AND SERVER MANAGEMENT

(71) Applicant: Lenovo Enterprise Solutions (Singapore) PTE. LTD., New Tech Park (SG)

(72) Inventors: David Daniel Chudy, Raleigh, NC (US); James Gordon McLean, Morrisville, MN (US); Cristian Medina, Morrisville, NC (US); Dharmesh Narendra Topiwala, Apex, NC (US)

(73) Assignee: Lenovo Enterprise Solutions (Singapore) PTE, LTD., New Tech Park (SG)

( * ) Notice: Subject to any disclaimer, the term of this patent is extended or adjusted under 35 U.S.C. 154(b) by 111 days.

(21) Appl. No.: 14/852,101

(22) Filed: Sep. 11, 2015

(65) Prior Publication Data
US 2017/0078877 A1  Mar. 16, 2017

(51) Int. Cl.
*H04W 12/06* (2009.01)
*H04W 4/00* (2009.01)
*H04L 29/06* (2006.01)

(52) U.S. Cl.
CPC ............ *H04W 12/06* (2013.01); *H04L 63/10* (2013.01); *H04W 4/008* (2013.01)

(58) Field of Classification Search
None
See application file for complete search history.

(56) References Cited

U.S. PATENT DOCUMENTS 6,970,917 B1 * 11/2005 Kushwaha .......... H04L 12/5895
  455/425
8,788,833 B2 * 7/2014 Fukui .................... H04L 9/3226
  713/182

(Continued)

OTHER PUBLICATIONS

Ahmed, S. "Dell iDRAC Quick Sync", Dell Corporation, Nov. 2014, 13 pp.

(Continued)

*Primary Examiner* — Kaveh Abrishamkar
(74) *Attorney, Agent, or Firm* — Jason Friday (57) ABSTRACT

A peer-to-peer wireless connection is established between a mobile client computing device and a server computing device, and information is communicated between the mobile client computing device and the server computing device over this connection. The information is sufficient for the server computing device and/or the mobile client computing device to authenticate the mobile client computing device with the server computing device. After the mobile client computing device has been authenticated with the server computing device, a user of the mobile client computing device is permitted to perform management tasks on the server computing device using the mobile client computing device, such as over the peer-to-peer wireless connection. For example, license keys can be moved from the mobile client computing device to the server computing device to upgrade the server computing device, and from the server computing device to the mobile computing device to downgrade the server computing device.

20 Claims, 3 Drawing Sheets

(56) References Cited

U.S. PATENT DOCUMENTS

| | | | | |
|---|---|---|---|---|
| 9,007,186 | B1* | 4/2015 | Krummey | G06F 1/266 |
| | | | | 340/12.32 |
| 9,137,347 | B1* | 9/2015 | Lee | H04M 1/66 |
| 9,468,078 | B1* | 10/2016 | White | H05B 37/0272 |
| 2003/0108017 | A1* | 6/2003 | Famolari | H04L 29/06 |
| | | | | 370/338 |
| 2004/0010579 | A1* | 1/2004 | Freese | G06F 11/3013 |
| | | | | 709/223 |
| 2011/0238806 | A1* | 9/2011 | Bhat | H04L 29/12566 |
| | | | | 709/223 |
| 2012/0167071 | A1* | 6/2012 | Paek | G06F 8/65 |
| | | | | 717/170 |
| 2014/0099981 | A1* | 4/2014 | Horbal | H04B 5/0031 |
| | | | | 455/466 |
| 2014/0101617 | A1* | 4/2014 | Yang | G06K 9/00288 |
| | | | | 715/846 |
| 2014/0159877 | A1* | 6/2014 | Huang | G08C 17/02 |
| | | | | 340/12.5 |

OTHER PUBLICATIONS

"Dell Introduces its Most Advanced Server Portfolio to Address Broadest Range of Business Computing Needs", Dell online press release, <http://www.dell.com/learn/us/en/uscorp1/press-releases/2014-09-08-dell-server-portfolio-poweredge-13g>, Sep. 8, 2014, 3 pp.

Hertig, A., "Sigsafe' Key Tag Brings Bitcoin Payments to NFC Devices", online <http://www.coindesk.com/sigsafe-key-tag-brings-bitcoin-payements-nfc-devices/>, Jun. 15, 2014, 5 pp.

Wikipedia, "Software license server", online <http://en.wikipedia.org/wiki/Software_license_server>, last modified Mar. 31, 2015, 2 pp.

* cited by examiner

FIG 1

PEER-TO-PEER WIRELESS CONNECTION BETWEEN SERVER COMPUTING DEVICE AND MOBILE CLIENT COMPUTING DEVICE FOR AUTHENTICATION AND SERVER MANAGEMENT

BACKGROUND

Data and the processing of data are the lifeblood of many entities like businesses and governmental organizations, as well as individual users. Large amounts of data are commonly stored on server computing devices, or servers, and similarly, processing of data can occur on servers. Entities and individuals, particularly larger entities, may maintain their own servers in server rooms or facilities. Other entities and individuals, particularly smaller entities, may outsource their data storage and processing needs to providers that maintain vast numbers of servers in large-scale facilities known as server farms.

SUMMARY

An example server computing device includes peer-to-peer wireless connection hardware to establish a peer-to-peer wireless connection with a mobile client computing device. The server computing device includes a processor and a non-transitory computer-readable medium storing computer-executable code. The code is executable by the processor to, after the peer-to-peer wireless connection has been established with the mobile client computing device, communicate information over the peer-to-peer wireless connection between the server computing device and the mobile client computing device sufficient for one of the server computing device and the mobile client computing device to authenticate the mobile client computing device with the server computing device. The code is executable by the processor to, after the mobile client computing device has been authenticated with the server computing device, permit a user of the mobile client computing device to perform management tasks on the server computing device using the mobile client computing device.

An example method includes establishing, by a mobile client computing device, a peer-to-peer wireless connection with a server computing device. The method includes communicating, by the mobile client computing device, information over the peer-to-peer wireless connection between the server computing device and the mobile client computing device sufficient for one of the server computing device and the mobile client computing device to authenticate the mobile client computing device with the server computing device. The method includes, after the mobile client computing device has been authenticated with the server computing device, permitting, by the mobile client computing device, a user of the mobile client computing device to perform management tasks on the server computing device using the mobile client computing device.

An example non-transitory computer-readable data storage medium stores computer-executable code executable by a mobile client computing device to perform a method. The method includes establishing a peer-to-peer wireless connection with a server computing device. The method includes, after the mobile client computing device has established the peer-to-peer wireless connection with the server computing device, permitting a user of the mobile client computing device to perform management tasks on the server computing device over the peer-to-peer wireless connection using the mobile client computing device. The management tasks are not performed via communication between the server computing device and the mobile client computing device over a communication connection other than the peer-to-peer wireless connection. No communication connection other than the peer-to-peer wireless connection is established between the server computing device and the mobile client computing device.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, entities and individuals may maintain their own server computing devices, or servers, or outsource such maintenance to service providers. In either case, a given physical installation, be it a single server room, a server facility, or an even larger-scale server farm, can house a large number of servers. Like all types of computing devices, servers can require periodic maintenance, and may be periodically upgraded. Therefore, an individual such as a network administrator, a technician, or other user may be faced with a large number of servers, have to identify the server requiring maintenance or upgrading, and ultimately establish a connection between this server and the individual's own computing device to perform service.

After the individual has identified the correct server, establishing a connection with this server can be difficult. Generally, the user has to know the server's network address in order to be able to establish a connection like a network connection with the server. This can be difficult to accomplish in practice when there are large numbers of servers in a particular room or facility. A stopgap solution is to have an identifying tag or sticker affixed to the server that lists the server's address. However, this approach is less than ideal, insofar as network addresses can and do change. Further, even after a connection has been established with the server, management thereof has historically assumed that the computing device the user will be using to perform such service is one with a relatively large display, like a laptop computer. This assumption is contrary to modern trends, however, in which many users carry just a small mobile computing device, like a smartphone, and may not always have access to a laptop computer.

Techniques disclosed herein alleviate these and other shortcomings. A user with a mobile client computing device like a smartphone can walk up to a particular server computing device. Once the mobile device is in close proximity to the server, a peer-to-peer wireless connection can be established between the two devices, such as a near-field communication (NFC) wireless connection. The mobile computing device and the server exchange information over this wireless connection that is sufficient for one of the two devices to authenticate the mobile device with the server computing device, including, for instance, the identity (such as the network address) of the mobile device, the server, or both. Once authentication has occurred, the user can then use his or her mobile device to perform management tasks on the server.

In one implementation, after authentication has occurred over the peer-to-peer wireless connection, a network connection that is different than the peer-to-peer wireless connection is established between the mobile client computing device and the sever computing device, and management of the server is effectuated over this network connection. For example, during the initial exchange of information over the peer-to-peer wireless connection, the mobile computing device may receive the server's network address, and use this information to establish a network connection with the server after the mobile device has been authenticated. The user thus does not have to know the server's network address a priori in order to perform service on the server, because the server notifies the user's mobile device of its address over the peer-to-peer connection.

In another implementation, after authentication has occurred over the peer-to-peer wireless connection, management of the server computing device occurs via communication between the mobile client computing device and the server over this same connection. Particularly in this implementation, the mobile client computing device may have functionality afforded to it for server management via an application program, or "app," that was previously installed on the mobile device. Such server management can leverage the peer-to-wireless connection to perform the management to be performed more easily than in the past.

For instance, a user may have on his or her mobile client computing device an application program that stores a "wallet" of license keys for on-demand features that can be added to server computing devices. An on-demand feature is a feature by which a server can be upgraded via a configuration change, without the need for little if any downtime and without the need for adding additional hardware to the server. For example, a server may be shipped with 128 network ports, but the user may have licensed only 64 network ports up-front; the other 64 network ports while physically present are thus unusable. The user may then have purchased a license key for another 32 network ports. Therefore, the user can walk up to the server, and upgrade the server by transferring the license key for the additional 32 network ports from the mobile device to the server, resulting in the server having 96 usable network ports.

Downgrading of on-demand features from server computing devices can be similarly achieved. In the prior example, it may be determined that not all 64 network ports that are currently licensed for use on the server are needed. Therefore, the user can walk up to the server, and downgrade the server by transferring a license key for, say, sixteen network ports from the server to the mobile client computing device, resulting in the server having 48 usable network ports. The user may then transfer the license key for these sixteen network ports to a different server to upgrade that latter server. Both upgrading and downgrading can be achieved over the peer-to-peer wireless connection that has been established between the mobile device and the server, without a different network connection ever being established between the two devices as is customary in current server management practices.

Figure 1:
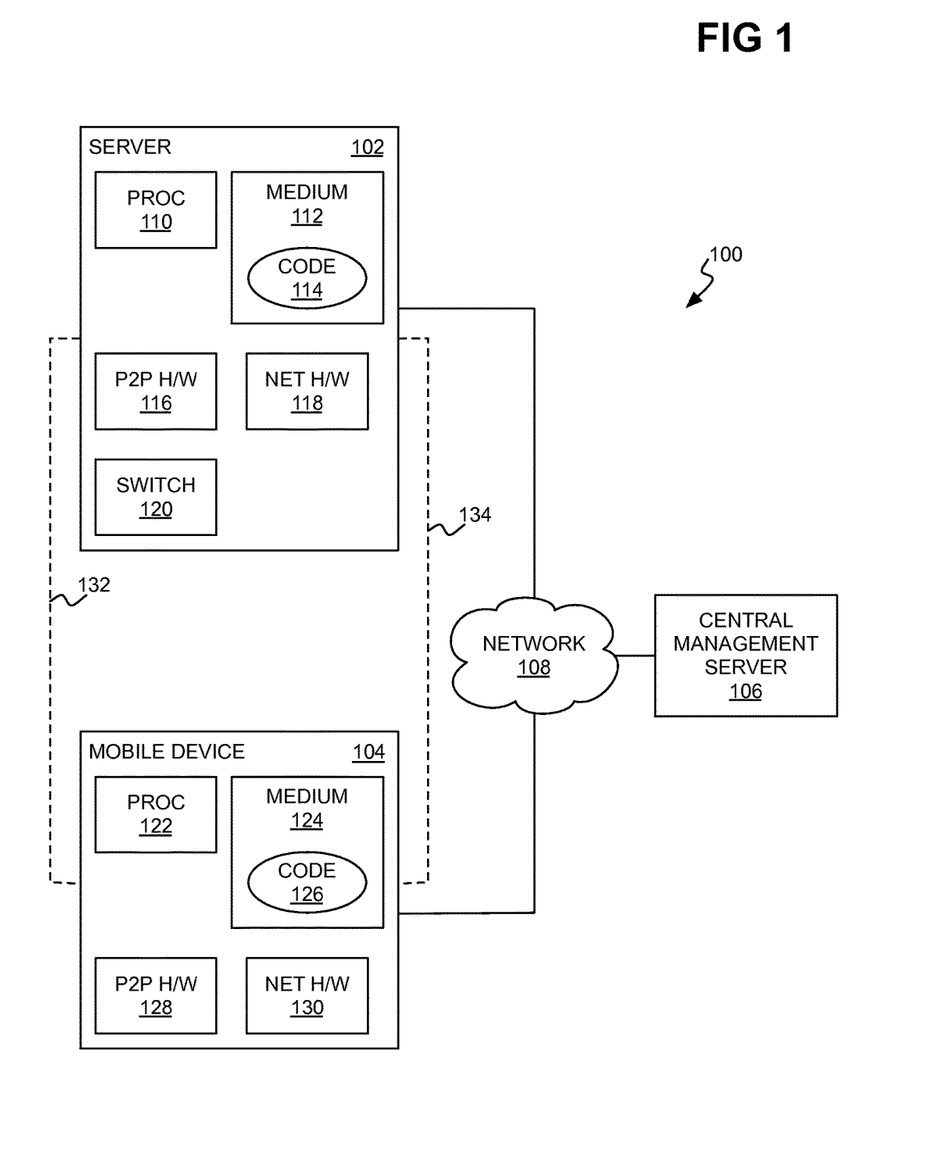
FIG. 1 is a diagram of an example system including a server computing device and a mobile client computing device between which a peer-to-peer wireless connection can be established.

FIG. 1 shows an example system 100. The system 100 includes a server computing device 102, which is also referred to as a server. The system 100 includes a mobile client computing device 104, which is also referred to as a mobile computing device or a mobile device, and which can be a smartphone. The system 100 can include a central management server 106, and a network 108 to which the server 102, the mobile device 104, and the central management server 106 can communicatively connect. The network 108 can be or include an Ethernet network, a local-area network (LAN), a wide-area network (WAN), an extranet, an intranet, the Internet, a mobile telephone network, and so on.

The server computing device 102 includes a processor 110 and a computer-readable medium 112 that stores computer-executable code 114 that is executable by the processor 110. In one implementation, the server 102 can include an out-of-band baseboard management controller (BMC) by which management of the server 102 occurs without taxing the other resources of the server 102. In this case, the processor 110 and the medium 112 are part of the BMC, and the server 102 can include another processor and another computer-readable medium in addition to those depicted in FIG. 1. The computer-readable medium 112 may be or include a volatile or a non-volatile storage medium, such as semiconductor memory, a hard disk drive, and so on.

The server computing device 102 includes peer-to-peer wireless connection hardware 116, which is also referred to as peer-to-peer hardware. In general, peer-to-peer communication is a decentralized communication in which each device, such as the server 102 and the mobile client computing device 104 can initiate a communication with the other device, and can communicate with the other device directly without the need for other hardware, such as an intermediating server, or even a router, an access point, and so on, in some scenarios. Examples of peer-to-peer wireless connections within the context of the specification include near-field communication (NFC) wireless connections, Bluetooth wireless connections, and Wi-Fi Direct wireless connections. These peer-to-peer wireless connections are decentralized ad hoc connections, because they do not rely on preexisting infrastructure, such as routers or access points in infrastructure wireless networks.

NFC wireless connections afforded by the peer-to-peer wireless connection hardware 116 that is specifically NFC hardware permit devices to establish radio communication with one another by touching the devices together, which is commonly referred to as "bumping," or otherwise bringing them into close proximity to one another, such as at a distance of one meter or less. Bluetooth wireless connections afforded by the peer-to-peer wireless connection hardware 116 that is specifically Bluetooth hardware permit devices to exchange data with one another over short distances, generally no greater than ten meters typically, using short-wavelength ultra-high frequency (UHF) radio waves, such as between 2.4 and 2.485 gigahertz (GHz). Wi-Fi Direct wireless connections afforded by the peer-to-peer wireless connection hardware 116 that is specifically Wi-Fi Direct hardware permit devices to connect with one another without requiring a wireless access point as typical Wi-Fi networks do. A Wi-Fi Direct wireless connection typically has the same range as a regular Wi-Fi wireless connection, but can be limited to require the proximity of an NFC connection, a Bluetooth connection, or a button press, the latter which is described later in the detailed description. A Wi-Fi Direct wireless connection can thus occur over regular Wi-Fi frequencies, such as 2.4 GHz and 5 GHz, at a range up to about 200 meters.

The server computing device 102 also includes network connection hardware 118 other than the peer-to-peer wireless connection hardware 116 that permits the server 102 to connect to the network 108 and therefore make network connections with other devices similarly connected to the network 108. The network connection hardware 118 in the case of the server 102 may be Ethernet network connection hardware, for instance. Although the hardware 118 typically affords a wired connection to the network 108, it can also be a wireless connection.

The server computing device 102 can include a switch 120—i.e., a button—which is associated with the peer-to-peer wireless connection hardware 116, particularly where the latter provides a Wi-Fi Direct wireless connection. For a computing device like the mobile client computing device 104 to establish a Wi-Fi Direct wireless connection with the server 102, a user of the mobile device 104 may first put the device 104 in a mode in which it is scanning for other Wi-Fi Direct-capable devices (like the server 102), and then press or otherwise actuate the switch 120. This causes the peer-to-peer wireless connection hardware 116 to begin establishing a connection with a device, like the mobile device 104, that is listening and ready for such a Wi-Fi Direct wireless connection.

The mobile client computing device 104 similarly includes a processor 122 and a computer-readable medium 124 storing computer-executable code 126 that is executable by the processor 122. The mobile device 104 also includes peer-to-peer wireless connection hardware 128. As such, a peer-to-peer wireless connection 132 can be established between mobile device 104 and the server computing device 102. The mobile device 104 includes network connection hardware 130 to permit the device 104 to connect to the network 108, and thus to establish a network connection 134 with the server 102 over the network 108. The mobile device 104 usually connects to the network 108 in a wireless manner, such as over a non-Wi-Fi Direct Wi-Fi wireless connection, or over a mobile telephony wireless connection, like a third-generation (3G), fourth-generation (4G), or long-term evolution (LTE) wireless connection. When the peer-to-peer wireless connection hardware 128 provides for Wi-Fi Direct wireless connections and the network connection hardware 130 provides for Wi-Fi wireless connections, the hardware 128 and the hardware 130 may be the same hardware that is capable of simultaneously establishing both a Wi-Fi Direct connection and a Wi-Fi connection.

The central management server 106 can provide authentication and other functionality in relation to a number of server computing devices including the server 102. As such, the identity of the mobile client computing device 104, such as a unique identifier of the mobile device 104, the name of the user of the device 104, and/or the network address of the device 104, may be stored in the central management server 106. Likewise, the identity of the server computing device 102, such as a unique identifier of the server 102 and/or the network address of the server 102, may be stored in the central management server 106.

The server 102 can receive the identity of the mobile client computing device 104 and pass it to the central management server 106 to determine whether the mobile device 104 is authenticated with the server 102 such that the user of the device 104 can perform management actions on the server 102 via the mobile device 104. In this scenario, authentication is initiated by the server 102. In another scenario, the mobile device 104 can receive the identity of the server 102 and pass it to the central management server 106, which then informs the server 102 whether the mobile device 104 is authenticated with the server 102 such that the user of the device 104 can perform management actions on the server 102 via the mobile device 104. In this scenario, authentication is initiated by the mobile device 104.

In a third scenario, authentication of the mobile client computing device 104 with the server computing device 102 may be automatic as a result of the mobile device 104 being able to establish the peer-to-peer wireless connection 132 with the server 102. That is, authentication may be location-based, such that if the mobile device 104 is sufficiently physically proximate to the server 102 to establish the peer-to-peer wireless connection 132, it automatically follows that the device 104 is authenticated with the server 102. Such location-based authentication may be considered sufficient when, for instance, the server 102 is located in a secure facility or room to which only authorized personnel have access. In this scenario, authentication is considered automatic and is initiated by neither the server 102 nor the mobile device 104.

Figure 2:
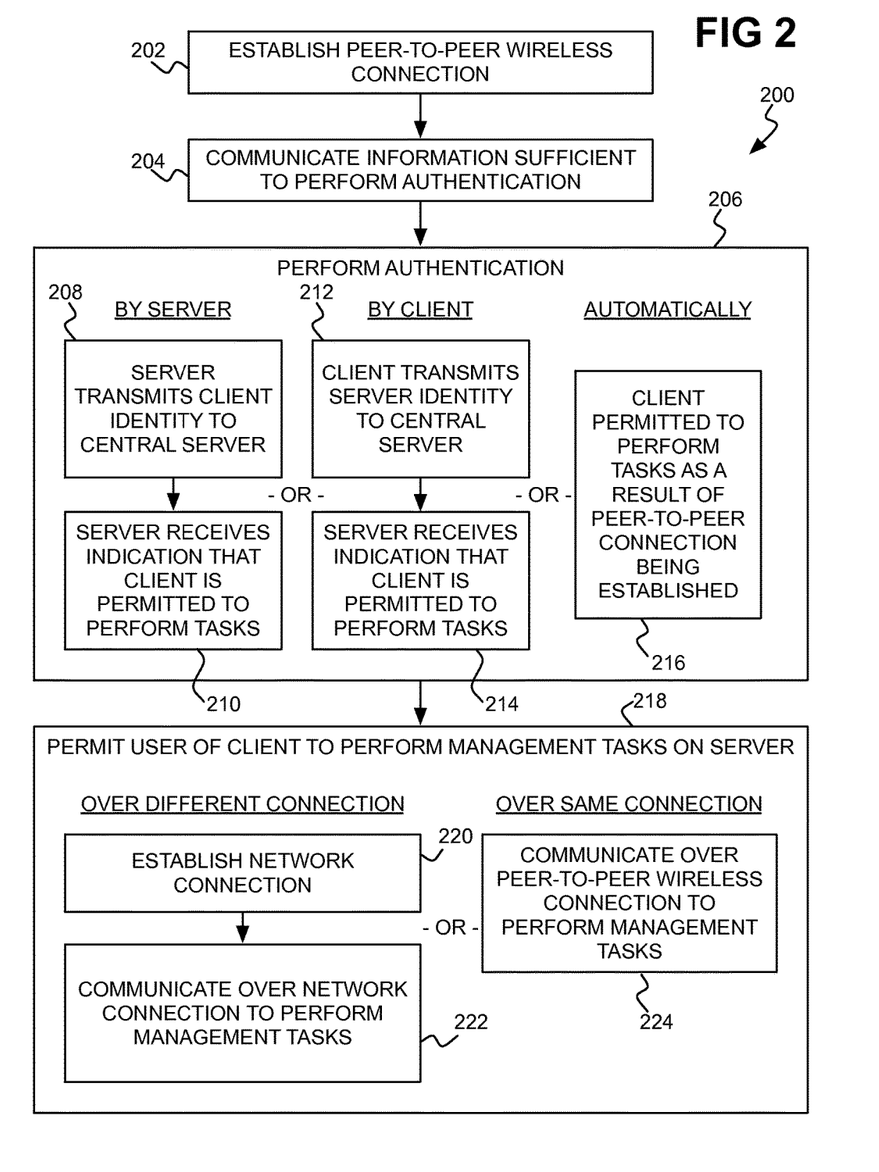
FIG. 2 is a flowchart of an example method by which a mobile client computing device establishes a peer-to-peer wireless connection with a server computing device so that a user of the mobile device can perform management tasks on the server.

FIG. 2 shows an example method 200. Some aspects of the method 200 are performed by the server computing device 102, such as via the processor 110 thereof executing the computer-executable code 114 stored on the computer-readable medium 112. Other aspects of the method 200 are performed by the client computing device 104, such as via the processor 122 thereof executing the computer-executable code 126 stored on the computer-readable medium 124.

A peer-to-peer wireless connection is established between the server computing device 102 and the mobile client computing device 104 (202). For example, in the case of an NFC wireless connection, this wireless connection is established responsive to two conditions occurring. First, the mobile device 104 is physically located in sufficiently close proximity to the server 102 for NFC communication to occur between the two devices. Second, the user of the mobile device 104 initiates the NFC wireless connection on the mobile device 104.

As a second example, in the case of a Bluetooth wireless connection, this wireless connection is established similarly responsive to two conditions occurring. First, the mobile client computing device 104 is physically located in sufficiently close proximity to the server computing device 102 for Bluetooth communication to occur between the two devices. Second, the user of the mobile device 104 initiates the Bluetooth wireless connection on the mobile device 104.

As a third example, in the case of a Wi-Fi Direct wireless connection, this wireless connection may be established responsive to three conditions occurring. First, the mobile client computing device 104 is physically located in sufficiently close proximity to the server computing device 102 for Wi-Fi Direct wireless communication to occur between the two devices. Second, the physical switch 120 of the server 102 corresponding to the Wi-Fi Direct wireless connection is actuated by the user of the mobile device 104. Third, the user of the mobile device 104 initiates the Wi-Fi Direct wireless connection on the mobile device 104.

Once the peer-to-peer wireless connection between the server computing device 102 and the mobile client computing device 104 has been established, the two devices communicate information between one another sufficient to perform authentication (204). The information communicated may differ depending on which of the server 102 or the mobile device 104, if either device, is to perform authentication. The mobile device 104 is then authenticated with the server 102 (206).

Authentication can be performed in three different ways. First, authentication may be initiated by the server computing device 102, and not by the mobile client computing device 104, in which case the information communicated in part 204 includes the identity of the mobile device 104. In this scenario, the server 102 transmits the identity of the mobile device 104, and may also transmit its own identity if this information is not inherent from the communication itself, to the central management server 106 over the network 108 (208). The server 102, therefore, has previously established a network connection with the central management server 106 over the network 108, where this network connection is different than the peer-to-peer wireless connection between the server 102 and the mobile device 104. In response, the server 102 receives indication from the central management server 106 that the mobile device 104 is permitted to perform management tasks on the server 102 (210).

Second, authentication may be initiated by the mobile client computing device 104, and not by the server computing device 102, in which case the information communicated in part 204 includes the identity of the server 102. In this scenario, the mobile device 104 transmits the identity of the server 102, and may also transmit its own identity if this information is not inherent from the communication itself, to the central management server 106 over the network 108 (212). The mobile device 104, therefore, has previously established a network connection with the central management server 106 over the network 108, where this network connection is different than the peer-to-peer wireless connection between the server 102 and the mobile device 104. In response, the server 102 again receives indication from the central management server 106 that the mobile device 104 is permitted to perform management tasks on the server 102 (214).

Third, authentication may be automatic, as noted above. That is, the mobile client computing device 104 is permitted to perform management tasks on the server computing device 102 as a result of the peer-to-peer wireless connection having been established between the mobile device 104 and the server 102 (216). In this scenario, the central management server 106 may not be involved in the authentication of the mobile device 104 with the server 102 at all.

Once the mobile client computing device 104 has been authenticated with the server computing device 102, the user of the mobile device 104 is permitted to perform management tasks on the server 102 using the mobile device 104 (218). Performing management tasks can be achieved in two different ways. First, the tasks can be performed via communication between the server 102 and the mobile device 104 over a network connection through the network 108 that is different than the peer-to-peer wireless connection. That is, the tasks are not performed using the peer-to-peer wireless connection. In this scenario, a network connection between the server 102 and the mobile device 104 is first established (220). For example, the information communicated in part 204 may include the network address of the server 102, so that the mobile device 104 can establish a network connection with the server 102. Once the network connection has been established, the mobile device 104 communicates with the server 104 over this network connection to perform management tasks (222).

Second, the tasks can be performed via communication between the server computing device 102 and the mobile client computing device 104 over the same peer-to-peer wireless connection established in part 202 (224). In this scenario, no other communication connection may be established between the server 102 and the mobile device 104. For example, the mobile device 104 does not have to establish a network connection with the server 102 via the network 108. Indeed, in one implementation, the mobile device 104 may perform management tasks on the server 102 without even knowing the network address of the server 102. That is, management tasks can be performed even if the network address of the server 102 is currently unknown to the mobile device 104.

The management tasks that the user of the mobile client computing device 104 can perform on the server computing device 102 using the mobile device 104 can include the same types of management tasks that can be performed using a non-mobile computing device, such as a desktop or laptop computer. For instance, the user can update software on the server 102, install new software, uninstall existing software, change configuration settings of the server 102, and so on. Furthermore, as has been noted above, the user can in one implementation add and remove features on-demand via corresponding license keys on the server 102.

Figure 3:
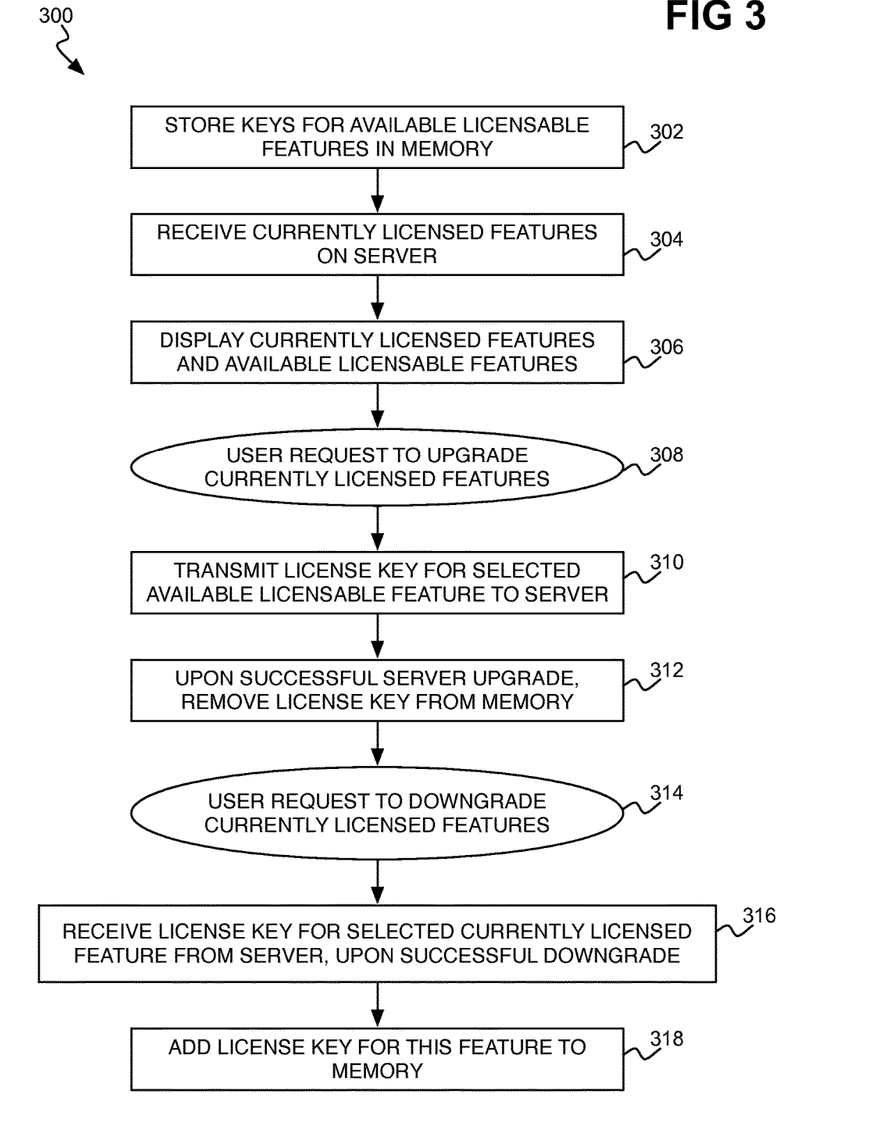
FIG. 3 is a flowchart of an example method by which a mobile client computing device can add and remove license keys for features on a server computing device.

FIG. 3 shows an example method 300 by which a user can use the mobile client computing device 104 to add and remove licenses for features on the server computing device 104 using the mobile device 104 in part 218 of the method 200, once the mobile device 104 has been authenticated with the server 102. The method 300 can be implemented as the computer-executable code 126 of the mobile device 104, such as in the form of an application program or "app." The features may be those that are already physically present on the server 102, but which can be enabled and disabled by adding and removing license keys, respectively. Examples of such features include network ports, expansion adapters, number of concurrent users for application programs, amount of memory, processors, processor cores, and so on.

License keys for available licensable features are stored on a memory of the mobile client computing device 104 (302), which may be the computer-readable medium 124. The mobile device 104 further receives a list of the currently licensed features on the server computing device 102 from the server 102 (304). The mobile device 104 displays both the available licensable features that can be added to the server 102, and the currently licensed features that can be removed from the server 102 (306).

For example, a user may request to upgrade the currently licensed features with a selected available licensable feature via a graphical user interface on the mobile client computing device 104 (308). In response, the license key for the selected available licensable feature is transmitted from the mobile device 104 to the server computing device 102 (310). Upon the server 102 being successfully upgraded, the license key is then removed from the memory of the mobile device 104 since the feature is now being used (312). For example, the server 102 may have two processors that each have eight processor cores, but just two processor cores of each processor are currently licensed for use. The user may therefore upgrade the server 102 by adding a license key corresponding to the remaining six processor cores of each processor, so that the processor cores of the processors of the server 102 can be fully utilized.

A user may also request to downgrade the currently licensed features on the server computing device 102 by removing a license key for a selected currently licensed feature, via a graphical user interface on the mobile client computing device 104 (314). In response, the license key for the currently licensed feature is transmitted from the server 102 to the mobile device 104 upon the server 102 being successfully downgraded (316). The license key for this feature, which is now an available licensed feature, is stored in the memory of the mobile device 104 (318), where it may be deployed to a different server, for instance. For example, the server 102 may have 128 gigabytes of random-access memory (RAM), and all of this memory may be currently licensed for use. The user may downgrade the server 102 by removing a license key for 32 gigabytes of memory from the server 102, such that 96 gigabytes are usable by the server 102. The license key for the 32 gigabytes of memory is stored in the memory of the mobile device 104, and the user can upgrade a different server using this key.

The techniques disclosed herein thus permit a user of a mobile client computing device to easily perform management tasks on a server computing device via establishing a peer-to-peer wireless connection with the server even if the user has no knowledge of the network address of the server. Further, license keys for features can be easily added to and removed from servers using this peer-to-peer wireless connection. As such, server management becomes much more convenient to network administrators, technicians, and other users that may be responsible for hundreds or even thousands of different servers, for example.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A server computing device comprising:
   peer-to-peer wireless connection hardware to establish a peer-to-peer wireless connection with a mobile client computing device;
   a processor; and
   a non-transitory computer-readable medium storing computer-executable code executable by the processor to:
      after the peer-to-peer wireless connection has been established with the mobile client computing device, communicate information over the peer-to-peer wireless connection between the server computing device and the mobile client computing device sufficient for one of the server computing device and the mobile client computing device to authenticate the mobile client computing device with the server computing device; and
      after the mobile client computing device has been authenticated with the server computing device, permit a user of the mobile client computing device to perform management tasks on the server computing device using the mobile client computing device, by:
         sending the mobile computing device a plurality of currently licensed features on the server computing device;
         receiving from the mobile computing device a license key for a selected available licensed feature not currently licensed on the server computing device; and
         upgrading the server computing device for the selected available licensed feature.

2. The server computing device of claim 1, wherein the peer-to-peer wireless connection hardware is near-field communication (NFC) hardware to establish an NFC wireless connection with mobile client computing device responsive to:
   the mobile client computing device being physically located in sufficiently close proximity to the server computing device; and
   the user of the mobile client computing device initiating the NFC wireless connection on the mobile client computing device.

3. The server computing device of claim 1, wherein the peer-to-peer wireless connection hardware is Bluetooth hardware to establish a Bluetooth wireless connection with the mobile client computing device responsive to:
   the mobile client computing device being physically located in sufficiently close proximity to the server computing device; and
   the user of the mobile client computing device initiating the Bluetooth wireless connection on the mobile client computing device.

4. The server computing device of claim 1, wherein the peer-to-peer wireless connection hardware is Wi-Fi Direct hardware to establish a Wi-Fi Direct wireless connection with the mobile client computing device, wherein the server computing device further comprises:
   a physical button corresponding to establishing the Wi-Fi Direct wireless connection,
   and wherein the Wi-Fi Direct hardware is to establish the Wi-Fi Direct wireless connection with the mobile client computing device responsive to:
   the mobile client computing device being physically located in sufficient close proximity to the server computing device;
   a physical button on the server computing device corresponding to establishing the Wi-Fi Direct wireless connection being actuated; and
   the user of the mobile client computing device initiating the Wi-Fi Direct wireless connection on the mobile client computing device.

5. The server computing device of claim 1, further comprising:
   network connection hardware other than the peer-to-peer wireless connection hardware to establish a network connection with a central management computing device, the network connection other than the peer-to-peer wireless connection,
   wherein the information comprises an identity of the mobile client computing device, and the computer-executable code is executable by the processor to further authenticate the mobile client computing device with the server computing device by:
      transmitting the identity of the mobile client computing device to the central management computing device over the network connection; and receiving indication from the central management computing device over the network connection that the mobile client computing device is permitted to perform the management tasks on the server computing device, wherein the server computing device initiates authentication of the mobile client computing device with the server computing device via the server computing device communicating with the central management computing device, and wherein the mobile client computing device does not initiate the authentication of the mobile client computing device with the server computing device.

6. The server computing device of claim 1, further comprising:

network connection hardware other than the peer-to-peer wireless connection hardware to establish a network connection with a central management computing device, the network connection other than the peer-to-peer wireless connection, wherein the information comprises an identity of the server computing device, and the computer-executable code is executable by the processor to further:

receive indication from the central management computing device over the network connection that the mobile client computing device is permitted to perform the management tasks on the server computing device, wherein the mobile client computing device initiates authentication of the mobile client computing device with the server computing device via the mobile client computing device communicating with the central management computing device, and wherein the server computing device does not initiate the authentication of the mobile client computing device with the server computing device.

7. The server computing device of claim 1, wherein the computer-executable code is executable by the processor to further:

automatically authenticate the mobile client computing device with the server computing device as a result of the mobile client computing device being physically located in sufficiently close proximity to the server computing device to establish the peer-to-peer wireless connection with the server computing device.

8. The server computing device of claim 1, further comprising:

network connection hardware other than the peer-to-peer wireless connection hardware to establish a network connection with the mobile client computing device, the network connection other than the peer-to-peer wireless connection, wherein the computer-executable code is executable by the processor to permit the user of the mobile client computing device to perform the management tasks on the server computing device by:

after establishing the network connection with the mobile client computing device, communicating between the server computing device and the mobile client computing device over the network connection to perform the management tasks, wherein the management tasks are not performed via communication between the server computing device and the mobile client computing device over the peer-to-peer wireless connection.

9. The server computing device of claim 1, wherein the computer-executable code is executable by the processor to permit the user of the mobile client computing device to perform the management tasks on the server computing device by:

communicating by the server computing device with the mobile client computing device over the peer-to-peer wireless connection to perform the management tasks, wherein the management tasks are not performed via communication between the server computing device and the mobile client computing device over a communication connection other than the peer-to-peer wireless connection, and wherein no communication connection other than the peer-to-peer wireless connection is established between the server computing device and the mobile client computing device.

10. A method comprising:

establishing, by a mobile client computing device, a peer-to-peer wireless connection with a server computing device;

communicating, by the mobile client computing device, information over the peer-to-peer wireless connection between the server computing device and the mobile client computing device sufficient for one of the server computing device and the mobile client computing device to authenticate the mobile client computing device with the server computing device; and after the mobile client computing device has been authenticated with the server computing device, permitting, by the mobile client computing device, a user of the mobile client computing device to perform management tasks on the server computing device using the mobile client computing device, by:

receiving, from the server computing device, a plurality of currently licensed features on the server computing device;

in response to a user request to upgrade the currently licensed features on the server computing device, transmitting the license key for a selected available licensable feature to the server computing device; and removing the license key from the mobile client computing device upon the server computing device being successfully upgraded.

11. The method of claim 10, wherein establishing the peer-to-peer wireless connection comprises establishing one of:

a near-field communication (NFC) wireless connection with the server computing device;

a Bluetooth wireless connection with the server computing device; and a Wi-Fi Direct wireless connection with the server computing device.

12. The method of claim 10, wherein the information comprises an identity of the mobile client computing device, wherein the server computing device initiates authentication of the mobile client computing device with the server computing device via the server computing device communicating with a central management computing device, and wherein the mobile client computing device does not initiate the authentication of the mobile client computing device with the server computing device.

13. The method of claim 10, wherein the information comprises an identity of the server computing device, and the method further comprises:

transmitting, by the mobile client computing device, the identity of the server computing device to a central management computing device over a network connection other than the peer-to-peer wireless connection, wherein the mobile client computing device initiates authentication of the mobile client computing device with the server computing device via the mobile client computing device communicating with the central management computing device, and wherein the server computing device does not initiate the authentication of the mobile client computing device with the server computing device.

14. The method of claim 10, wherein the mobile client computing device is automatically authenticated with the server computing device as a result of the mobile client computing device being physically located in sufficiently close proximity to the server computing device to establish the peer-to-peer wireless connection with the server computing device.

15. The method of claim 10, wherein permitting the user of the mobile client computing device to perform the management tasks on the server computing device comprises:

establishing a network connection with the server computing device, the network connection being a communication connection other than the peer-to-peer wireless connection; and communicating between the server computing device and the mobile client computing device over the network connection to perform the management tasks, wherein the management tasks are not performed via communication between the server computing device and the mobile client computing device over the peer-to-peer wireless connection.

16. The method of claim 10, wherein permitting the user of the mobile client computing device to perform the management tasks on the server computing device comprises:

communicating by the mobile client computing device with the server computing device over the peer-to-peer wireless connection to perform the management tasks, wherein the management tasks are not performed via communication between the server computing device and the mobile client computing device over a communication connection other than the peer-to-peer wireless connection, and wherein no communication connection other than the peer-to-peer wireless connection is established between the server computing device and the mobile client computing device.

17. A non-transitory computer-readable data storage medium storing computer-executable code executable by a mobile client computing device to perform a method comprising:

establishing a peer-to-peer wireless connection with a server computing device; and after the mobile client computing device has established the peer-to-peer wireless connection with the server computing device, permitting a user of the mobile client computing device to perform management tasks on the server computing device over the peer-to-peer wireless connection using the mobile client computing device, wherein the management tasks are not performed via communication between the server computing device and the mobile client computing device over a communication connection other than the peer-to-peer wireless connection, wherein no communication connection other than the peer-to-peer wireless connection is established between the server computing device and the mobile client computing device, and wherein permitting the user of the mobile client computing device to perform the management tasks on the server computing device comprises:

storing a plurality of keys for available licensable features on a memory of the mobile client computing device;

receiving, from the server computing device over the peer-to-peer wireless connection, a plurality of currently licensed features on the server computing device;

in response to a user request to upgrade the currently licensed features on the server computing device, transmitting the license key for a selected available licensable feature of the available licensed features to the server computing device over the peer-to-peer wireless connection; and removing the license key for the selected available licensable feature from the memory of the mobile client computing device upon the server computing device being successfully upgraded.

18. The non-transitory computer-readable data storage medium of claim 17, wherein permitting the user of the mobile client computing device to perform the management tasks on the server computing device further comprises:

displaying the currently licensed features on a display of the mobile client computing device; and displaying the available licensable features.

19. The non-transitory computer-readable data storage medium of claim 17, wherein permitting the user of the mobile client computing device to perform the management tasks on the server computing device further comprises:

in response to a user request to downgrade the currently licensed features on the server computing device, receiving a license key for a selected currently licensed feature of the currently licensed features on the server computing device over the peer-to-peer wireless connection upon the server computing device being successfully downgraded, such that the selected currently licensed feature becomes a new available licensable feature; and adding license key for the new available licensable feature to the memory of the mobile client computing device, the new available licensable feature now available for transmission to a different server computing device to upgrade the different server computing device.

20. The non-transitory computer-readable data storage medium of claim 17, wherein a network identity of the server computing device is currently unknown to the mobile client computing device.

* * * * *